United States Patent [19]

Salzberg

[11] Patent Number: 5,080,582

[45] Date of Patent: Jan. 14, 1992

[54] SYSTEM FOR CURING EPOXY IN A FIBER OPTIC CONNECTOR

[75] Inventor: Jose B. Salzberg, Des Plaines, Ill.

[73] Assignee: Molex Incorporated, Lisle, Ill.

[21] Appl. No.: 560,416

[22] Filed: Jul. 30, 1990

[51] Int. Cl.⁵ .................................................. F27D 11/00
[52] U.S. Cl. ............................ 432/226; 156/158; 156/166; 156/499; 432/34; 432/277; 432/231; 219/385; 219/518; 219/521
[58] Field of Search ............... 432/32, 33, 34, 36, 432/45, 225, 226, 227, 230, 231; 219/385, 386, 390, 518, 521; 156/158, 166, 293, 359, 423, 433, 499

[56] References Cited

U.S. PATENT DOCUMENTS

| | | | |
|---|---|---|---|
| 4,439,143 | 3/1984 | Hanamoto et al. | 432/36 |
| 4,461,616 | 7/1984 | Vukovich, Jr. | 432/36 X |
| 4,713,523 | 12/1987 | MacDonald | 219/385 |
| 4,964,689 | 10/1990 | Wichansky | 156/158 X |

*Primary Examiner*—Henry A. Bennet
*Assistant Examiner*—Christopher Kilner
*Attorney, Agent, or Firm*—Louis A. Hecht; Stephen Z. Weiss; A. A. Tirva

[57] ABSTRACT

A system is disclosed for curing epoxy in a fiber optic connector. An oven has a receptacle for receiving the connector with an exposed length of an optical fiber projecting therefrom. A heat conductive sheath is positionable on the connector about the optical fiber for distributing heat from the oven and for protecting the fiber when the connector is inserted into the receptacle. Sensing elements are located in the path of insertion movement of the fiber optic connector and conductive sheath to be actuated thereby in response to the connector being inserted into the receptacle. A micro-controller is coupled between the sensing elements and audible/visual signals. The micro-controller includes a timer to actuate the audible/visual signals after a predetermined period of time within which the heater is energized.

26 Claims, 2 Drawing Sheets

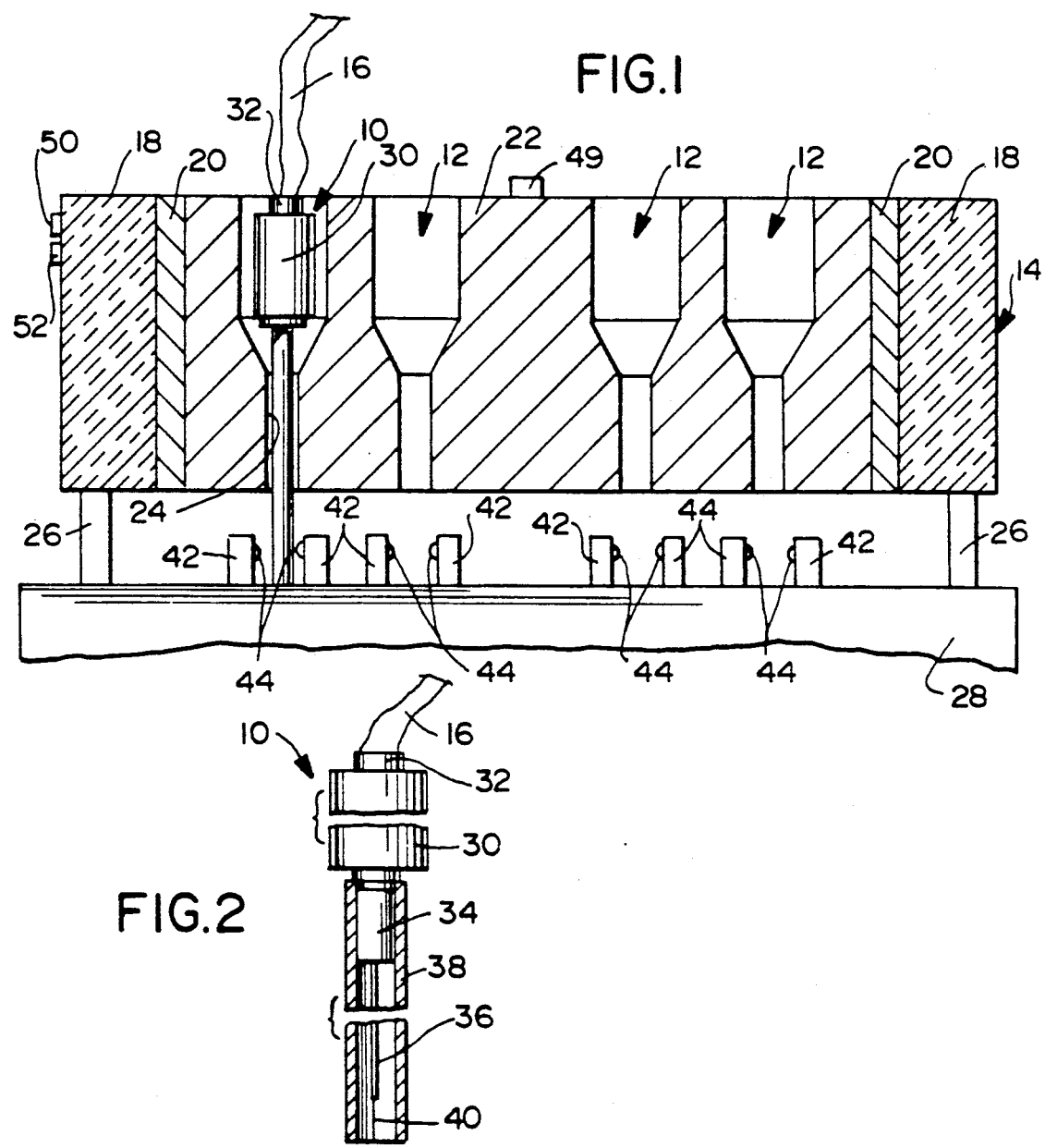

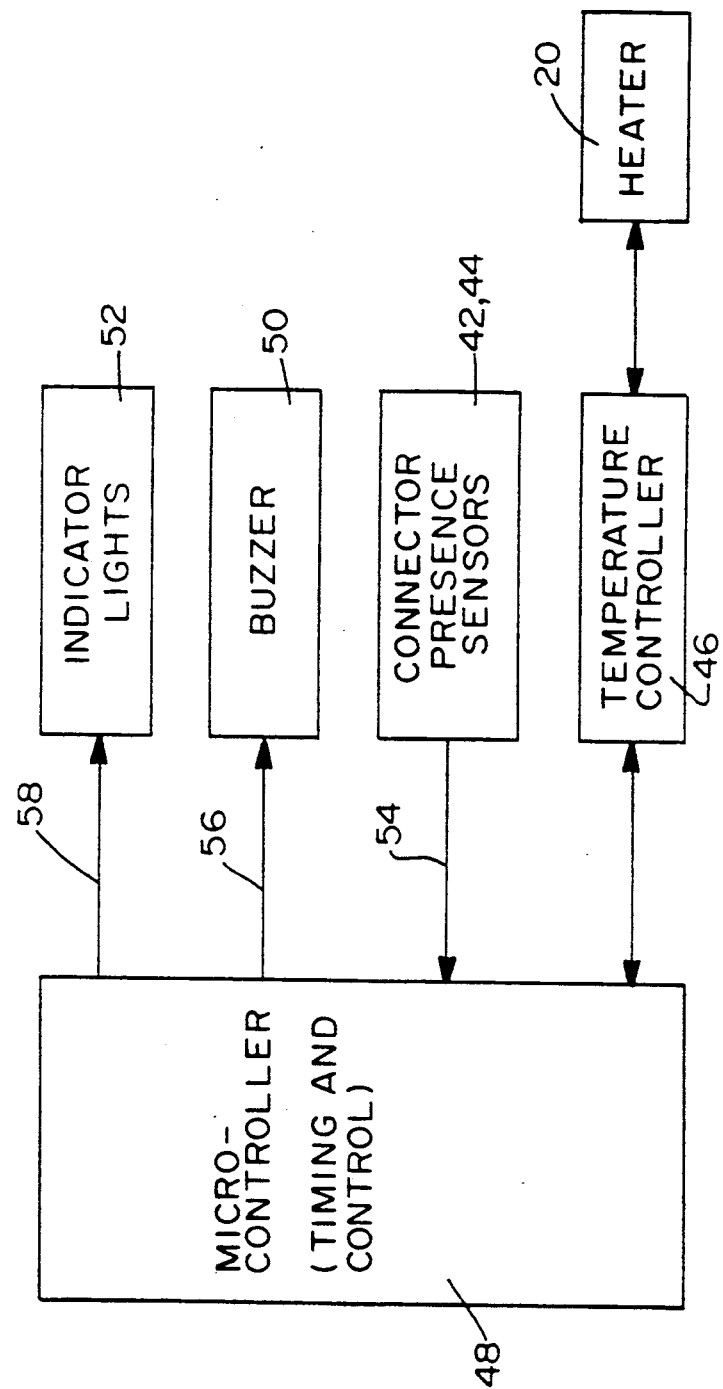

SYSTEM FOR CURING EPOXY IN A FIBER OPTIC CONNECTOR

FIELD OF THE INVENTION

This invention generally relates to fiber optic connectors and, particularly, to a system including an oven for curing the epoxy used to secure the connector components including the optical fiber.

BACKGROUND OF THE INVENTION

Fiber optic connectors are used to terminate ends of fiber optic cables for mating with complementary connectors or other communications components. A cable often is secured within a connector by an epoxy which usually must be cured by heating in an oven or the like.

A fiber optic cable conventionally includes an outer covering, such as of plastic material, one or more inner optical fibers each surrounded by its own cladding, such as of plastic material, and a longitudinal strength system, such as fine fibers extending lengthwise inside the outer covering and around the cladded fibers.

In terminating such a fiber optic cable within a connector, normally the outer covering and the strength system are cut away, and a length of the fiber(s) is stripped of its cladding. The cable, with the exposed fiber, then is secured within the connector by epoxy which must be heat cured.

Various problems are encountered during these assembly and heat curing processes. For instance, the exposed optical fiber is very tiny and brittle and often is broken when the connector is inserted into the curing oven. For efficiency purposes, it is desirable not to continuously heat the oven when a connector is not disposed therein for curing. In addition, heating for an undue length of time is not desirable because it may damage components of the connector. Uniform distribution of heat, particularly about the optical fiber, is desirable but heretofore has not been achieved.

All of these problems have been solved by the invention herein by providing a protective sheath removably positionable on the connector to surround the exposed fiber. The sheath protects the fiber from contact by extraneous objects during insertion into the heating oven. The sheath is heat conductive to more uniformly distribute heat from the oven to the surrounded components of the connector, including the fiber. The oven can be provided with a heating cycle which is initiated by the sheath after actuating a sensor operatively coupled to the oven heater.

SUMMARY OF THE INVENTION

An object, therefore, of the invention is to provide a new and improved system for curing epoxy in a fiber optic connector of the character described.

In the exemplary embodiment of the invention, the system includes an oven having receptacle means for receiving the fiber optic connector with an exposed length of an optical fiber projecting therefrom. A heat conductive sheath is positionable on the connector about the optical fiber for distributing heat from the oven and for protecting the fiber when the connector is inserted into the receptacle means of the oven. As disclosed herein, actuatable sensor means, either optoelectrical or mechanical, are located in the path of insertion movement of the conductive sheath to be actuated thereby and to automatically initiate a timing process for the sensed connector.

The oven includes heater means, and the system includes audible and visual signal means, with micro-controller means coupled between the heater means and the audible and visual signal means. The micro-controller means include timing means to actuate the audible and visual signal means after a predetermined period of time to signal when a heating cycle is over whereupon an operator can remove the connector. The micro-controller turns on a "ready" signal when the oven reaches its working temperature after being turned on.

The heat conductive sheath is shown herein in the form of a longitudinally split tube. The split tube is easily removably positioned over a ferrule of the connector by a press-fit to surround the exposed fiber, and the receptacle means of the oven includes a bore portion into which the split tube is removably positionable.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the following description taken in conjunction with the accompanying drawings, in which like reference numerals identify like elements in the figures and in which:

FIG. 1 is a vertical section through an oven, showing one fiber optic connector disposed therein, and including the concepts of the system of the invention;

FIG. 2 is a vertical section, broken away and on an enlarged scale, illustrating the fiber optic connector having the heat conductive sheath positioned thereon; and FIG. 3 is a schematic diagram of the heater means of the oven, along with the controls and other components operatively coupled thereto.

DETAILED DESCRIPTION OF THE PREFERRED EMBODIMENT

Referring to the drawings in greater detail, and first to FIG. 1, the invention contemplates a system for curing epoxy in a fiber optic connector, generally designated 10. The connector is insertable into one of a plurality of receptacle means, generally designated 12, of an oven, generally designated 14. Broadly, the connector receives the various components of a fiber optic cable 16, with epoxy applied thereto, for securing the cable within the connector. Oven 14 then supplies the heat for curing the epoxy.

Oven 14 includes an outer thermal insulating housing 18 surrounding an inner heater means or heating element 20. The receptacles 12 may be provided in various arrays, such as the linear array shown in FIG. 1. The receptacles are defined in a hot plate 22 thermally coupled to heating element 20. Other arrays of receptacles such as circular arrays, polygonal arrays and the like are contemplated by providing interconnected hot plates 22 thermally coupled to the surrounding heating element 20. For purposes described hereinafter, each receptacle 12 includes a bore portion 24 of particular cross-sectional dimensions. Housing 18 is shown supported by an upright frame 26 above a base 28. However, any appropriate supporting means is contemplated for supporting oven 14.

Referring to FIG. 2 in conjunction with FIG. 1, electrical connector 10 includes a body portion 30, a crimping ferrule 32 and a forwardly projecting fiber ferrule 34. Crimping ferrule 32 is conventional and normally is used to crimp onto the outer covering of cable 16. As described above, a conventional fiber optic cable includes an outer covering, one or more optical fibers each surrounded by a cladding, and inner longitudinal strength members between the outer covering and the inner cladding. This composite cable extends somewhat into body 30 so as to be crimped thereabout by crimping ferrule 32. The outer covering and inner strength system of the cable are cut away to expose the cladded fiber(s), and the cladding about the fiber is removed to expose the tiny, brittle fiber which extends through ferrule 34 and to project from a distal end thereof, as at 36, in FIG. 2. Fiber ferrule 34 conventionally is fabricated of ceramic or metal material. It can be seen that fiber 36 is exposed on the outside of ferrule 34. As stated above, this tiny brittle fiber is very easy to break during manual manipulation should the fiber come into contact with a foreign object.

To that end, the invention contemplates providing a tube-like sheath 38 of a size to press-fit about fiber ferrule 34. The tube should be at least long enough to extend beyond the distal end of fiber 36. The tube may be longitudinally split, as at 40, to provide resiliency therefore to effect an easy fit of the tube about ferrule 34 but provide inherent resiliency to grip the ferrule. It can be seen in FIG. 1 that tube 38 completely surrounds and hides the exposed fiber, whereupon connector 10, along with an assembled tube 38, can be inserted into receptacle means 12 without the fiber coming into contact with the receptacle means. Bore portions 24 of the receptacle means are sized slightly larger than the tube to enable the tube to be inserted therein and allowing the connector and tube to be readily removed from the receptacle means without binding.

A feature of the invention is providing tube 38 of a heat conductive material. Therefore, the tube is in direct heat conduction with the heated environment within the oven. Consequently, the tube more evenly distributes the heat to connector 10, particularly fiber ferrule 34, than if the connector and exposed fiber were inserted into the oven without such a heat distribution means.

At this point, it should ba pointed out that oven 14, along with its supporting means, is of a size and shape and number of receptacle means 12 to be readily applicable for field use in terminating fiber optic cables to or within their connectors. Heretofore, a problem with such heating ovens has been the lack of control therefore. Excessive heat can be applied to the connectors over too long heating cycles. This invention includes various controls for the oven to obviate the problems heretofore encountered.

More particularly, generally, sensor means are operatively coupled to heating element 20 of oven 14 to automatically initiate a timing cycle for a connector in any given receptacle means in response to a connector 10 and tube 38 being inserted into one of the receptacle means 12. Specifically, it can be seen that a pair of spaced sensing elements 42 are disposed below each bore 24 of each receptacle means 12. These sensing elements may be of various operative configurations, such as optoelectrical or mechanical, to sense the presence of a connector and tube within a receptacle means. For instance, FIG. 1 shows a pair of opposing elements 44 of a photoelectrical cell, for instance. Tube 38 is of a sufficient length to extend beyond a respective bore 24 and between the sensing elements. Likewise, a mechanical/electrical micro-switch may be disposed between the elements for engagement and actuation by the distal end of tube 38. The location of the sensing means shown in FIG. 1 is only one structural configuration. Sensing means could be provided within bore 24, within the upper portion of receptacle means 12, on top of hot plate 22 or in any other location which satisfactorily can sense the presence of a connector within proper position within the oven.

One control configuration is shown in FIG. 3 to include the operative features of the invention. It can be seen that heating element 20 is coupled through a temperature controller 46 to a micro-controller 48. Temperature controller 46 may be a thermostat for controlling the temperature within oven 14 (not shown in FIG. 1). A "ready" light 49 (FIG. 1) is turned on by micro-controller 48 when the oven reaches its working temperature after being turned on. Sensing elements 42, 44 are coupled to micro-controller 48. The micro-controller at least includes components for timing and an on-off controller for heater 20. Therefore, when a tube 38 is positioned between sensing elements 42, 44, a signal is received by the micro-controller. After a predetermined period of time, micro-controller 48 signals audible and visual signal means that a time period has elapsed so that an operator can remove the connector from the oven.

More particularly, an audible "buzzer" 50 and a visual indicator light 52 may be coupled to the micro-controller for energization after a given period of time programmed into the micro-controller. For simplicity purposes, one buzzer 50 and one indicator light 52 are shown on the outside of housing 18 of oven 14 in FIG. 1. These audible and visual indicators may have appropriate indicia means thereon correlated to the particular receptacle means 12 within which a connector is positionable. Although not shown in the drawings, additional inputs 54 (FIG. 3) can be added from each set of sensing elements 42, 44 to the micro-controller, and additional outputs 56 and 58 (FIG. 3) can be provided from the micro-controller to respective buzzers 50 and indicator lights 52 for each sensor means for each receptacle means. The audible and/or visual indicator means can be appropriately located on the outside of housing 18 and correlated by appropriate indicia means to respective ones of receptacles 12 so that an operator can determine which connector is "finished" in an epoxy curing cycle. In other words, the micro-controller assumes the function of a number of independent timers, one for each receptacle means. This makes it possible to insert connectors into the plural that each one is timed correctly. In a fiber optic connector termination environment this feature allows several workers to use one oven at the same time, or one worker to insert a new connector while other connectors are being processed.

From the foregoing, it can be seen that the single heat conductive tube 38 (1) protects the exposed optical fiber 36, (2) helps to distribute the heat about the fiber and the connector and (3) provides a means for actuating the sensing elements coupled to the micro-controller of the system. In addition, the micro-controller provides safeguards by signalling an operator, both audibly and visually, when a predetermined heating period is over for a given connector received within the oven.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A system for curing epoxy in a fiber optic connector, comprising:
   an oven having receptacle means for receiving the fiber optic connector with an exposed length of an optical fiber projecting therefrom; and
   a heat conductive sheath positionable on the connector about the optical fiber for distributing heat from the oven and for protecting the fiber when the connector is inserted into the receptacle means of the oven.

2. The system of claim 1, including actuatable sensor means located in the path of insertion movement of the fiber optic connector and conductive sheath to be actuated thereby in response to the connector and sheath being properly inserted into the receptacle means.

3. The system of claim 2 wherein said sensor means are located in the path of movement of a distal end of the heat conductive sheath.

4. The system of claim 2 wherein said sensor means include optoelectrical means.

5. The system of claim 2 wherein said sensor means include micro-switch means.

6. The system of claim 1 wherein said heat conductive sheath is in the form of a tube.

7. The system of claim 6 wherein said fiber optic connector includes a ferrule through which the optical fiber extends, and the tube is sized to be removably press-fit over the ferrule about an exposed length of the fiber projecting from a distal end of the ferrule.

8. The system of claim 7 wherein said tube is slit lengthwise thereof to facilitate said press-fit.

9. The system of claim 6 wherein said receptacle means includes a bore portion and said tube is sized to be removably fit into the bore portion.

10. The system of claim 2 including audible signal means, and micro-controller means coupled between the sensor means and the audible signal means, the micro-controller means including timing means to actuate the audible signal means after a predetermined period of time after actuation of the sensor means.

11. The system of claim 2 including visual signal means, and micro-controller means coupled between the sensor means and the visual signal means, the micro-controller means including timing means to actuate the audible signal means after a predetermined period of time after actuation of the sensor means.

12. The system of claim 11, including audible signal means, with the micro-controller means coupled between the sensor means and the audible signal means.

13. A system for curing epoxy in a fiber optic connector, comprising:
   an oven having receptacle means for receiving the fiber optic connector with an exposed length of an optical fiber projecting therefrom;
   a protective sheath positionable on the connector about the optical fiber for protecting the fiber when the connector is inserted into the receptacle means of the oven; and
   an actuatable sensor means located in the path of insertion movement of the fiber optic connector and protective sheath to be actuated thereby in response to the connector and sheath being properly inserted into the receptacle means.

14. The system of claim 13 including audible signal means, and micro-controller means coupled between the sensor means and the audible signal means, the micro-controller means including timing means to actuate the audible signal means after a predetermined period of time after actuation of the sensor means.

15. The system of claim 13 including visual signal means, and micro-controller means coupled between the sensor means and the visual signal means, the micro-controller means including timing means to actuate the audible signal means after a predetermined period of time after actuation of the sensor means.

16. The system of claim 15, including audible signal means, with the micro-controller means coupled between the sensor means and the audible signal means.

17. The system of claim 13 wherein said protective sheath is in the form of a tube.

18. The system of claim 17 wherein said fiber optic connector includes a ferrule through which the optical fiber extends, and the tube is sized to be removably press-fit over the ferrule about an exposed length of the fiber projecting from a distal end of the ferrule.

19. The system of claim 18 wherein said tube is slit lengthwise thereof to facilitate said press-fit.

20. The system of claim 17 wherein said receptacle means includes a bore portion and said tube is sized to be removably fit into the bore portion.

21. A system for curing epoxy in a fiber optic connector including a ferrule through which an optical fiber extends, comprising:
   an oven including heater means and having receptacle means for receiving the fiber optic connector with an exposed length of an optical fiber projecting therefrom;
   a heat conductive tube sized to be removably press-fit over the ferrule of the connector about the exposed length of the fiber for distributing heat from the oven and for protecting the fiber when the connector is inserted into the receptacle means of the oven; and
   actuatable sensor means located in the path of movement of the heat conductive tube when the fiber optic connector is inserted into the receptacle means whereby the sensor means is actuated in response to the connector and tube being inserted into the receptacle means.

22. The system of claim 21 wherein said receptacle means includes a bore portion sized to removably receive the tube, the tube being slit lengthwise thereof to facilitate its press-fit over said ferrule.

23. The system of claim 21 including audible signal means, and micro-controller means coupled between the sensor means and the audible signal means, the micro-controller means including timing means to actuate the audible signal means after a predetermined period of time after actuation of the sensor means.

24. The system of claim 21 including visual signal means, and micro-controller means coupled between the sensor means and the visual signal means, the micro-controller means including timing means to actuate the audible signal means after a predetermined period of time after actuation of the sensor means.

25. The system of claim 24, including audible signal means, with the micro-controller means coupled between the sensor means and the audible signal means.

26. A system for curing epoxy in a fiber optic connector, comprising:
an oven having receptacle means for receiving the fiber optic connector; and
sensor means operatively located in the path of insertion movement of the fiber optic connector to be actuated thereby in response to the connector being inserted into the receptacle means.

* * * * *